July 19, 1949.  W. H. BROWNE ET AL  2,476,582
METHOD OF MAKING FILTER UNITS
Filed June 11, 1945  2 Sheets-Sheet 1
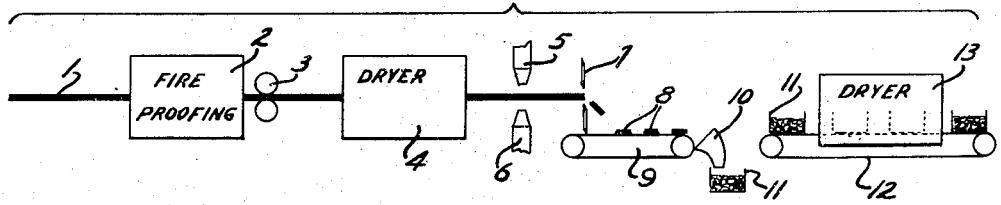
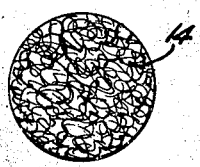   
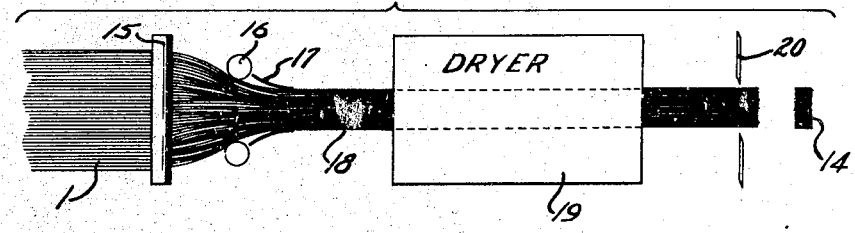
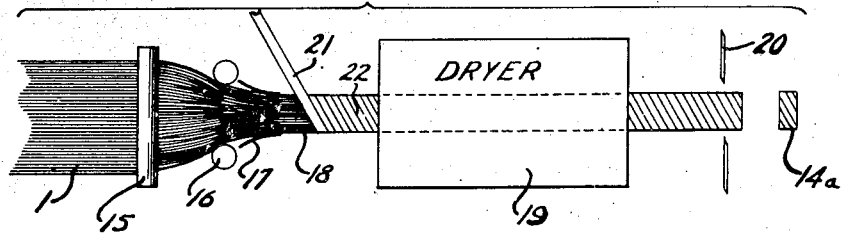
Inventors
WILLIAM H. BROWNE
ARNOLD E. PAVLISH
by The Firm of Charles Hills Attys.

July 19, 1949.  W. H. BROWNE ET AL  2,476,582
METHOD OF MAKING FILTER UNITS
Filed June 11, 1945  2 Sheets-Sheet 2
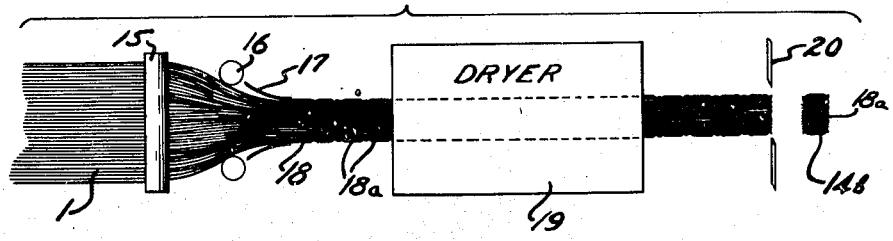
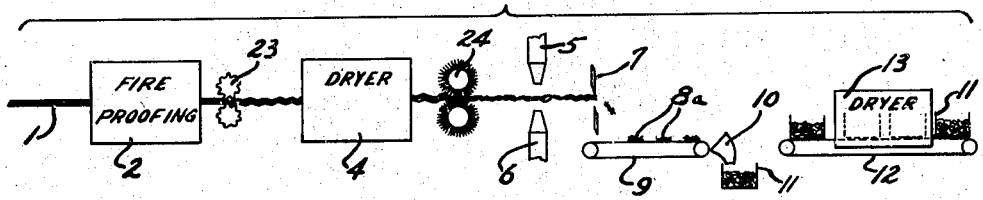
  
Inventors
WILLIAM H. BROWNE
ARNOLD E. PAVLISH
by The Firm of Charles W. Hill Attys.

Patented July 19, 1949

2,476,582

UNITED STATES PATENT OFFICE 2,476,582

METHOD OF MAKING FILTER UNITS

William H. Browne and Arnold E. Pavlish, Columbus, Ohio, assignors, by mesne assignments, to Houdaille-Hershey Corporation, Detroit, Mich., a corporation of Michigan Application June 11, 1945, Serial No. 598,892

12 Claims. (Cl. 28—73)

1

This invention relates to improvements in a method of making a filter unit, and more particularly to the method of making a filter unit highly desirable for use in liquid bath air cleaners of the type used in connection with the intakes to internal combustion engines, air compressors and similar apparatus, although the invention may be practiced to produce filter units having other uses, as will be apparent to one skilled in the art.

In the past, many and various types of filter units for air cleaners and similar apparatus have been developed, and these units have been produced by many and various methods. Insofar as commercial usage is concerned, by far the greater number of these formerly known filter units utilized cactus fiber, curled cattle-tail hair, various formations of screens, or wavy metallic wire as a filter medium. Cactus or pineapple fiber filter units, commonly referred to as "Tampico" filters, were objectionable in that channeling resulted when these units were used in air cleaners. Cattle-tail hair filter units were objectionable in that these units matted when used in oil bath or liquid bath air cleaners. Screen formations alone would not give a desirably high efficiency. Perhaps the best all-around filter medium heretofore known was the wavy metallic wire medium especially when formed into a mass, but that medium is objectionably expensive. In addition, insofar as we are aware, no filter units for a liquid bath air cleaner, and especially an automotive air cleaner, have heretofore been produced by any method sufficiently economically to warrant discarding of a dirty filter unit and replacement thereof by a new unit, rather than go through the operation of cleansing the dirty unit already in use.

With the foregoing in mind, it is an important object of the instant invention to provide a new and novel method of making a filter element or unit for liquid bath air cleaners and similar apparatus.

Another object of the instant invention is the provision of a new and novel method of economically producing a filter unit for air cleaners and similar apparatus by forming the unit of vegetable fiber.

It is also an object of this invention to provide a new and novel method of making a filter unit out of sisal fiber, the unit being highly desirable for use in connection with liquid bath air cleaners and similar apparatus.

A further feature of the invention resides in the provision of a new and novel method of making an air cleaner filter unit of economical material, it being also sufficiently economical to practice the method and produce a filter unit so low in cost as to warrant replacement of a used dirty unit by a new one, rather than the expense, labor and material necessary to cleanse the dirty unit.

Also an object of the instant invention is the provision of a new method of making a filter for air cleaners and similar apparatus, including the steps of aligning vegetable fibers longitudinally of the resultant unit, bonding the fibers together, and cutting an element of predetermined size from the aligned and bonded fibers.

Another object of the instant invention is the provision of a new method of making a filter unit, including the steps of aligning vegetable fibers longitudinally of the resultant unit, crimping the fibers, forming a bundle of the crimped fibers, and cutting the bundle to provide a filter unit of a desired length.

A further feature of the instant invention resides in the provision of a new and novel method of producing a filter unit including the steps of arranging vegetable fibers to form a substantially continuous elongated bundle of predetermined diameter, and applying a covering over the bundle as the bundle is being made in a substantially continuous and complete operation, and then severing the covered bundle into filter units of desired length.

Still a further feature of the instant invention resides in the provision of a new and novel method of making a filter unit including the steps of arranging vegetable fibers in substantially parallel relationship, fireproofing the fibers, bonding the fibers, and then shaping and binding the bonded fibers into a mass to form a filter unit of predetermined size.

Still another object of the instant invention is the provision of a new and novel method of making a filter unit from vegetable fiber, including the steps of substantially paralleling the fibers, fireproofing the same, crimping the fibers, and then heat treating the crimped fibers, taking advantage of the moisture provided by the fireproofing to steam the crimped shape into the fibers.

It is also an object of this invention to provide a new and novel method of making filter units for air cleaners and similar apparatus, which method includes the steps of arranging vegetable fibers into an elongated substantially continuous core of predetermined size, binding such core so that it will retain its shape when severed into smaller portions, and cutting the bound core into filter units of predetermined lengths.

While some of the more salient features, characteristics and advantages of the instant invention have been above pointed out, others will become apparent from the following descriptions of preferred embodiments of the method or process of making a filter unit, taken in conjunction with the accompanying drawings in which apparatus employed in the practice of the method is diagrammatically indicated, and in which:

Figure 1 is a fragmentary side elevational view illustrating diagrammatically steps in one embodiment of the instant invention;

Figure 2 is a top plan view of a filter unit resulting from the practice of the instant invention;

Figure 3 is a side elevational view of the unit of Figure 2;

Figure 4 is a fragmentary plan view illustrating a variation in the later steps of the method shown in Figure 1;

Figure 5 is a fragmentary plan view of general character as that of Figure 4, illustrating another variation in the practice of the method;

Figure 6 is a fragmentary plan view, illustrating a still different step in completing the resultant filter unit to provide a unit of slightly different character than those previously shown;

Figure 7 is another fragmentary side elevational view indicating diagrammatically the manufacture of a filter unit in accordance with the instant invention where crimping of the fibers is embodied;

Figure 8 is a fragmentary magnified plan view of a group of fibers after the initial crimping; and Figure 9 is a view similar in character to Figure 8 indicating the disposition of the fibers in the resultant filter unit.

The instant method may be practiced to produce a fibrous or stranded filter unit in which the fibers or strands are of various kinds of vegetable material, various kinds of plastics, or of metal, and where the term "strand" is used herein and in the appended claims, the same is to be understood as including fibers or strands composed of any of such materials. An economical and highly satisfactory basic material for the filter unit is sisal fiber, or a vegetable fiber of equivalent characteristics when used as a filter medium, and for the purpose of clarity, the instant method will be explained on the assumption that sisal fiber is being used to make the filter unit.

Sisal or equivalent vegetable fiber may be obtained in bales of raw fibers, rather limp, and from two to four feet in length. As received, the raw fiber frequently retains part of the leaves from which it was derived, and therefore a carding operation is preferable to remove the unwanted woody inclusions.

At the outset, the fibers, approximating three feet in length, may be taken from the bale or other initial supply, and carded into a broad flat mass, indicated at 1 in Figure 1, having an extremely high percentage of oriented fibers, such as 99.9%. This may be accomplished with the aid of a suitable carding machine, not shown.

Inasmuch as sisal fibers burn rather readily, it is substantially necessary to fireproof or flameproof them, especially for use in an air cleaner of the type associated with internal combustion engines where backfire may occur. One suitable method of fireproofing is impregnation of the fibers with a water-soluble fireproofing or flameproofing material that is fire resistant. One satisfactory substance for this purpose is a 20% solution of ammonium sulfamate in water, and the fireproofing operation may generally be accomplished by immersing the carded fibers in such a solution, and the fibers may be effectively fireproofed by such an immersion of approximately five minutes duration, although in many cases less time is necessary.

Perhaps the optimum time for effecting the fireproofing operation is just after the raw fibers have been carded and before these fibers have been given any ultimately desired shape, as indicated at 2. If the fireproofing takes place prior to the carding operation, a considerable amount of the solution is wasted on the foreign material which is subsequently removed by the carding operation. After the fibers have been crimped, or otherwise shaped to a desired configuration, immersion of the fibers in a solution containing water frequently destroys the shape of the fibers to a material extent. After the fibers have been bonded by a suitable plastic, effective flameproofing or fireproofing by the simple immersion operation is extremely difficult, and in some instances would be ineffective.

It will be understood that the above method of fireproofing is only a preferred method, and fireproofing may be accomplished in other ways, such as by precipitation of an insoluble material within the fiber to be fireproofed, or by the deposition of a fire-resistant coating on the surface of the fiber, but the use of a water soluble material is satisfactory and economical and avoids the risk of a surface coating flaking off during subsequent use under vibration.

Following the fireproofing operation, the impregnated fiber mat is then preferably passed between pressure rolls 3 to remove the excess fireproofing solution. Then the mat of fibers may be dried either in an oven as indicated at 4 or by some other method of applying sufficient heat for the purpose. The drying operation can be effected at a temperature in the neighborhood of 180° to 200° F. Of course, the temperature required, as well as the time required depend upon both the amount of water present and the amount of fiber being treated at any particular time. In general, the above range of temperatures prove satisfactory, and the drying time may range from a minute to an hour, usually five or ten minutes being sufficient to drive out the water content of the applied fireproofing solution.

After the drying operation, the mat is then treated with a thermo-plastic or a thermo-setting plastic which acts as a bonding medium for the fibers. A suitable method of application for the bonding medium is by spraying the mat, preferably both sides simultaneously with the aid of suitable nozzles 5 and 6. The plastic thus will impregnate the fiber. The bonded fiber will be somewhat more brittle when a thermo-setting plastic is used than when a thermo-plastic is used. Suitable materials for this bonding operation include resinous agents such as a copolymer of vinyl chloride with vinylidene chloride, and in some cases with an alkyd thermo-plastic, although other plastics may also be satisfactory, the above being mentioned by way of example only and not by way of limitation. It is, of course, more advantageous in connection with the present invention to use a vinyl resin or an alkyd resin because they are soluble in organic solvents, rather than use a water soluble resin and risk dissolution and loss of some of the previously applied water-soluble fireproofing agent.

It is desirable to have the resultant bond between the fibers resilient to some extent so that the resultant filter unit possesses inherent resiliency so that the unit will have the advantages of being self-sealing when pressed into a filter holding element in an air cleaner by virtue of its resilient pressure against the wall of the holding element, and so that the unit will be better enabled to resist compacting after long usage. The bond obtained is satisfactory if it has a resiliency generally between that of phenol formaldehyde resins, which mark the harder type, and the alkyd resins, which represent the more resilient type.

The relatively high melting point of vinyl chlorides, however, requires the packing of the fibers into the ultimately desired shape of the filter unit while the fibers are still wet with the plastic solvent. On the other hand, the alkyd resins may be permitted to dry before the fibers are packed into the desired shape of the ultimate filter unit.

Of course, the bonding plastic might be applied to the fibers either before or after the fibers are packed into the ultimate shape of the filter unit by the process of immersion. However, it is preferable to spray the plastic on the fibers prior to packing in filter unit shape because of the high effective weight of filters thus produced. In general, the dust removing efficiency of the filter unit increases with an increase in weight of fibers employed in the building of the unit. Where the fibers are lumped, or compacted so as to produce in effect a single strand of multiple thickness, or a single compact mat of strands, the efficiency of the unit is thereby decreased. Therefore, since greater uniformity may be achieved by spraying the individual fibers prior to packing them in a filter unit shape, the effective weight of the unit produced in this manner is greater than the effective weight of units bonded by means of an immersion bath or by spraying subsequently to packing in filter unit shape.

It will be appreciated that all of the steps so far described in connection with the instant invention may be accomplished in a single piece of apparatus. That is, a carding machine may be provided and equipped with sufficient extra apparatus to accomplish all these steps in one continuous movement of material through the machine. During the progress through the carding machine, the fibers become joined at the ends so that the ultimate fiber mat is substantially endless and continuous.

Following the application of the plastic bonding material, the mat of fibers is next shaped or packed into the form of the ultimate filter unit. Of course, the fibers may be cut to the desired length and then packed within a mold of steel, glass, or other suitable material of the shape and substantially of the size of the ultimate filter unit. This may be accomplished by way of a suitable shearing mechanism diagrammatically indicated at 7, and relatively short lengths of fibers 8 may drop upon a conveyor 9 and be advanced into a chute or funnel 10 which guides them into a mold 11. The chute or funnel may be aided by an air blast or blower, if desired. The molds carrying the deposited fibers may then be transported by a suitable conveyor 12 through a drier 13 which sets the plastic impregnating the fibers.

After the plastic has set, the resultant filter element 14, seen in Figures 2 and 3 may be removed from its respective mold. It is desirable to have such a mold slightly oversized, so that there will be a tight frictional contact between the filter units, by virtue of their inherent resiliency, and the ultimate filter housing means in which they are to be positioned for use.

Another way of shaping or packing the fibers is illustrated in Figure 4 and includes forming the mat into what might be termed a cylindrical bundle, which, as stated above, will be substantially continuous. This operation would occur after the mat 1 has passed the plastic spray nozzles 5 and 6. In forming the bundle, the mat may be shaped through properly disposed wheels or rotary guide members 15 and 16 and urged through a converging nozzle 17 until a continuous bundle 18 of the desired cross-sectional area and shape is provided. The bundle 18 may then be passed through a drier 19, and after leaving the drier end portions of the bundle may be sheared off by a cutting means indicated at 20, and each end portion will be one of the filter units 14.

In one form of the instant invention, a covering may be provided over that continuous fiber bundle 18, by way of spirally winding paper board 21 around the bundle until an enclosing tube 22 is formed, as shown in Figure 5. The tube is wound upon the extruded bundle as it leaves the shaping mechanism so that the entire operation is preferably continuous. If desired, the tubing may be formed seamless. In providing the tubular covering, the shaped fiber acts as a core during the making of the tube.

The entire arrangement is then subjected to a heat treatment or the equivalent in the drier 19 to set the applied plastic, remove any excess solvent and thus bond the fibers together and also to the tubular covering 22 through fusion of the plastic thereon at points of contact. It will be understood that the plastic has impregnated the fibers, provided the material used is a vegetable fiber such as sisal, and not a metallic strand, and thus the fibers are provided with adequate stiffness while being bonded together into substantially a uniform filter mass. The heat treating operation may satisfactorily be accomplished in a time of one-half to one hour, and at a temperature of 250 degrees to 300 degrees F., depending upon the particular plastic used, these ranges being given by way of example and not by way of limitation.

After the last heating operation, the elongated tube with its fiber core may be severed into desired lengths, each length constituting an individual filter element or unit 14a. If end screens for the unit are desired, they may be used, but with a unit of the character made under the present method, no such end screens are necessary, the fibers or strands being bonded together and to the tubular cover encasing them. Such a unit is substantially uniform in character, and provides a high filtering efficiency. The entire unit may be easily slipped into the casing of an air cleaner or similar apparatus, and held in position by any desired means, such as an easily mountable spring wire clip. If a metal container for the unit is desired, the covered unit may be inserted into a can or the like. A unit of this character may be manufactured sufficiently economically to warrant disposition of the unit and substitution by a new unit, after a period of use. It is an exceedingly simple expedient when servicing an air cleaner, to withdraw a dirty unit, discard it, and insert a new unit.

A slightly different embodiment of the invention includes the elimination of the paper board or equivalent covering around the fiber core, as seen in Figure 6. In the event an air cleaner already contains a filter holding element, such as a metallic cylinder or the equivalent, it is not essential that the filter unit have any covering therearound at the time it is inserted in or removed from the air cleaner. Accordingly, as the elongated substantially endless fiber core or bundle 19 is produced, it may be tied at spaced intervals with a cord or tape as at 18a, either before or after the final heat treating operation. Then the elongated fiber core may be cut transversely between adjacent bindings by the cutters 20, and the ties or bindings may be located so that when the core is severed into individual filter units 14b, each unit is tied or bound adjacent each end thereof. Such ties will, of course, effect a binding of the character effected by the paper board tube or equivalent substance above described. The tying will compress the filter unit somewhat so that after severance, each individual unit 14b is somewhat barrel shaped; that is, the unit will have a greater diameter or cross-sectional area in the central portion than at the ends where the ties are located. Such a unit by virtue of its smaller ends, may be readily inserted into the holding element of an air cleaner, and no gasket means are necessary in order to seal the unit in position, due to the increased size of the central portion of the unit which will press against the wall of the holding element sufficiently to effect an air-tight seal and force the air to travel through the filter unit itself.

Still another embodiment of the invention is shown in Figures 7, 8 and 9 and includes the crimping of the fibers or strands going to make up the filter unit. A satisfactory size of crimp is one with a quarter-inch pitch. The fiber is crimped throughout its entire length, and with all of the fibers or strands so crimped, there will be no danger of the fibers being bonded together a distance along their lengths after the application of the plastic and the final heat treating of it. The fibers will be bonded together only at spaced points therealong. However, it is necessary to include at least two additional operations in the method to provide a filter unit having crimped fibers or strands. A suitable crimping machine generally shown at 23 may be placed either inside or immediately in advance of the first oven or heat treating apparatus 4 so that the crimping occurs immediately following the application of the fireproofing material. Then while the fibers are firmly held in crimped form they are passed through the first oven which dries out the water from the fireproofing material, sufficient moisture is provided by the fireproofing material itself for steaming the crimp into the fibers or strands. As stated above, the crimping may occur just prior to or during the drying operation. With crimped strands or fibers, it is preferable to again card the mat prior to the application of the plastic as indicated at 24 so that the crimping of one fiber is not uniform with the crimping of adjacent fibers, and consequently, after the curing of the plastic the fibers or strands will be bonded together only at spaced points therealong by virtue of the crimping. This is best seen in the enlarged showings in Figures 8 and 9, wherein a group of individual strands 26 are shown as they appear upon leaving the crimping mechanism 23, and in Figure 9 a group of the same strands are indicated at 27 in their new disposition after leaving the carding mechanism 24, the crimps now being out of phase with each other. After this second carding operation, the fibrous mat may be treated as above described in connection with any of the figures in the drawings in order to produce the ultimate filter unit. Binding may be provided for each crimped filter unit, either by way of a paper board or equivalent covering around the unit, or by way of spaced ties, depending upon whether or not in actual use a complete covering of the unit is desired or necessary.

It will be understood, of course, that in the practice of the present method certain steps in the process may be omitted in the event metallic strands are used to form the filter mat, such for example as the fireproofing step, and possibly other steps obvious to one skilled in the art and depending upon the particular material used. For economy of product without loss of efficiency and with highly satisfactory operation, a filter made of sisal fibers has proven satisfactory.

The specific filter unit per se, and a crimping machine per se, are more fully described and claimed in respective copending applications, namely, Browne and Pavlish "Air cleaner and filter unit therefor," Serial No. 598,893, filed June 11, 1945, and Browne and Lindeman "Crimping machine," Serial No. 624,376, filed October 25, 1945.

From the foregoing, it is apparent that we have provided a new and novel method of making a filter unit, which is highly desirable for use in liquid bath air cleaners and similar apparatus. It will be noted that the practice of the method is economical, and the process is substantially a continuous one. The product produced by practicing the method is also economical, highly efficient, and readily handled, so that it is a simple expedient to remove a dirty filter unit, and substitute a brand new filter unit, rather than go to the work and expense of cleansing the dirty one.

It will, of course, be understood that various details of the process may be varied through a wide range and the sequence of certain steps varied without departing from the principles of this invention and it is, therefore, not the purpose to limit the patent granted thereon otherwise than necessitated by the scope of the appended claims.

We claim as our invention:

1. In a method of making a filter unit for insertion in the casing of an automotive air cleaner, the steps of arranging numerous strands generally lengthwise of the resultant unit, bunching the strands, bonding the strands together, and externally transversely binding the bunched and bonded strands adjacent each end thereof to form a filter unit having end portions of less cross-sectional area than the intermediate body portion.

2. In a method of making a filter unit, the steps of arranging numerous strands generally lengthwise of the resultant unit, crimping the strands, bunching the crimped strands, breaking up the registry of the crimps, and bonding the strands together at points of contact.

3. In a method of making a filter unit, the steps of arranging numerous strands generally lengthwise of the resultant unit, crimping the strands, carding the crimped strands to break up the registry of the crimps, bunching the crimped strands with the crimps of adjacent strands in irregular order, and bonding the strands together at points where adjacent strands contact each other.

4. In a method of making a filter unit, the steps of carding vegetable fibers, applying liquid fireproofing compound to the carded fibers, crimping the fibers, and heat treating the crimped fibers to drive out the moisture therein while utilizing said moisture to steam the crimps into the fibers.

5. In a method of making a filter unit, the steps of carding vegetable fibers, applying liquid fireproofing compound to the carded fibers, crimping the fibers, and heat treating the crimped fibers to drive out the moisture therein while utilizing said moisture to steam the crimps into the fibers, carding the crimped fibers to break up the registry of the crimps, applying a liquid bonding agent to the fibers, bunching the fibers, and heat treating the bunched fibers to set the bonding agent.

6. In a method of making a filter unit, the steps of applying a liquid fireproofing compound to a mass of vegetable fibers, crimping the mass of fibers, and heat treating the fibers to drive out the moisture therein utilizing the moisture being driven out to steam the crimps into the fibers.

7. In a method of making a filter unit, the steps of carding vegetable fibers into a flat mat with the fibers extending lengthwise of the resultant filter unit, fireproofing said mat of fibers, applying a liquid bonding agent to the mat of fibers, shaping the mat into a cylindrical core, heat treating the core to set the bonding agent, and cutting the core into desired lengths.

8. In a method of making a filter unit, the steps of carding vegetable fibers into a flat mat with the fibers extending lengthwise of the resultant filter unit, fireproofing said mat of fibers, applying a liquid bonding agent to the mat of fibers, shaping the mat into a cylindrical core, heat treating the core to set the bonding agent, binding the core therearound at spaced intervals, and cutting the core between adjacent bindings.

9. In a method of making a filter unit, the steps of carding vegetable fibers into substantially a continuous flat mat, applying liquid fireproofing to said mat, crimping the fibers, heat treating the crimped fibers to drive out the moisture therein, carding the crimped fibers to break up the registry of the crimps, applying a plastic bonding agent to the fibers, shaping the mat into a core, heat treating the core to set the applied plastic and bond the fibers together, and cutting the core into desired lengths.

10. In a method of making a filter unit, the steps of carding vegetable fibers, applying a soluble fireproofing agent to the fibers, crimping the fibers, heating the crimped fibers to drive out the solvent of the fireproofing agent and steam in the crimps, carding the crimped and fireproofed fibers to bring the crimps of adjacent fibers out of registry, applying a wet plastic bonding agent to the fibers, packing the wet fibers into the desired shape of the ultimate filter unit while wet, and heat treating the fibers to remove moisture and set the plastic bond.

11. In a method of making a filter unit, the steps of applying a fireproofing substance to a quantity of inflammable fibers, undulating the fibers, separating the fibers to bring at least the majority of undulations out of registry, applying a liquid bonding agent to the fibers, massing the fibers, heat treating the fibers to set the bonding agent to join adjacent fibers at points of contact therebetween, and cutting a filter unit from the bonded mass.

12. In a method of making a filter unit for insertion in the casing of an automotive air cleaner, the steps of arranging fibers generally lengthwise in the direction air is to travel through the filter, bonding the fibers together at spaced points to provide an inherently resilient bunch, and externally binding such bunch of fibers adjacent each end thereof to compress and reduce the size of the ends relatively to the intermediate portion to permit ready insertion of the unit in the cleaner casing with the intermediate portion of the unit effecting a seal against the casing wall by virtue of its inherent resiliency.

WILLIAM H. BROWNE.
ARNOLD E. PAVLISH.

REFERENCES CITED

The following references are of record in the file of this patent:

UNITED STATES PATENTS

| Number | Name | Date |
| --- | --- | --- |
| 1,057,724 | Grabein | Apr. 1, 1913 |
| 1,359,104 | Rheinberger | Nov. 16, 1920 |
| 1,833,315 | Burhans | Nov. 24, 1931 |
| 1,923,168 | Simmons | Aug. 22, 1933 |
| 1,990,849 | Wagon | Feb. 12, 1935 |
| 2,054,809 | Fleisher | Sept. 22, 1936 |
| 2,139,675 | Fleisher | Dec. 13, 1938 |
| 2,190,744 | Vander Jagt | Feb. 20, 1940 |
| 2,208,632 | Dreyfus | July 23, 1940 |
| 2,245,874 | Robinson | June 17, 1941 |
| 2,247,308 | Redman | June 24, 1941 |
| 2,293,918 | Planiol | Aug. 25, 1942 |
| 2,311,704 | Simison | Feb. 23, 1943 |
| 2,321,512 | Protz | June 8, 1943 |
| 2,321,985 | Briggs | June 15, 1943 |
| 2,357,392 | Francis, Jr. | Sept. 5, 1944 |

FOREIGN PATENTS

| Number | Country | Date |
| --- | --- | --- |
| 554,383 | Great Britain | July 1, 1943 |